(12) United States Patent
Donovan et al.

(10) Patent No.: US 11,811,079 B2
(45) Date of Patent: Nov. 7, 2023

(54) SYSTEMS AND METHODS OF USE FOR A BATTERY PACK ENCLOSURE

(71) Applicant: BETA AIR, LLC, South Burlington, VT (US)

(72) Inventors: Sean Richard Donovan, Richmond, VT (US); Sam Wagner, Westford, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/878,009

(22) Filed: Jul. 31, 2022

(65) Prior Publication Data
US 2022/0393276 A1 Dec. 8, 2022

Related U.S. Application Data

(63) Continuation of application No. 17/319,174, filed on May 13, 2021, now Pat. No. 11,456,499.

(51) Int. Cl.
| | |
|---|---|
| *H01M 50/184* | (2021.01) |
| *H01M 10/04* | (2006.01) |
| *H01M 50/169* | (2021.01) |
| *H01M 10/0525* | (2010.01) |
| *H01M 50/224* | (2021.01) |
| *H01M 50/242* | (2021.01) |
| *H01M 50/574* | (2021.01) |

(52) U.S. Cl.
CPC ........ *H01M 50/184* (2021.01); *H01M 10/04* (2013.01); *H01M 50/169* (2021.01); *H01M 10/0525* (2013.01); *H01M 50/224* (2021.01); *H01M 50/242* (2021.01); *H01M 50/574* (2021.01); *H01M 2220/20* (2013.01); *Y02E 60/10* (2013.01)

(58) Field of Classification Search
CPC ............ H01M 10/04; H01M 10/0525; H01M 2220/20; H01M 50/169; H01M 50/184; H01M 50/224; H01M 50/242; H01M 50/574; Y02E 60/10
See application file for complete search history.

(56) References Cited

U.S. PATENT DOCUMENTS

| | | | | |
|---|---|---|---|---|
| 2002/0162696 | A1* | 11/2002 | Maus | H01M 50/244 180/68.5 |
| 2008/0050645 | A1* | 2/2008 | Kai | B60L 50/64 429/93 |
| 2017/0214103 | A1* | 7/2017 | Onnerud | H01G 11/06 |

* cited by examiner

*Primary Examiner* — Lingwen R Zeng
(74) *Attorney, Agent, or Firm* — CALDWELL INTELLECTUAL PROPERTY LAW

(57) ABSTRACT

Aspects relate to systems and methods for manufacture of a battery pack including a metal case circumscribing an inner volume circumscribed on all but one open side, where the case additionally includes a sealing rim positioned at least partially about the open side, a first component that includes at least two or more sides of the case, and a second component that includes at least one other side of the case, at least a battery module installed within the inner volume of the case, and an inner panel installed within the inner volume, between the case and the at least a battery module. In some aspects, sealing rim, first component, and second component are all joined together by welding.

18 Claims, 4 Drawing Sheets

SYSTEMS AND METHODS OF USE FOR A BATTERY PACK ENCLOSURE

CROSS-REFERENCE TO RELATED APPLICATIONS

This application is a continuation of Non-provisional Application Ser. No. 17/319,174 filed on May 13, 2021, and entitled "SYSTEM AND METHODS OF USE FOR A BATTERY PACK ENCLOSURE" the entirety of which is incorporated herein by reference.

FIELD OF THE INVENTION

The present invention generally relates to the field of thermoelectric and photoelectric batteries. In particular, the present invention is directed to systems and methods of use for a battery pack enclosure.

BACKGROUND

Battery packs often include a plurality of battery cells which need to be contained, for example within an enclosure. Commonly, these enclosures are flimsy, expensive to produce, and is unable to contain a fire within the enclosure. As the promise of electric vehicles is beginning to today be realized on land, sea, and air, the need for an easily produced and safe battery enclosure only grows more urgent.

SUMMARY OF THE DISCLOSURE

In an aspect a battery pack includes a metal case circumscribing an inner volume circumscribed on all but one open side, where the case additionally includes a sealing rim positioned at least partially about the open side, a first component that includes at least two or more sides of the case, and a second component that includes at least one other side of the case, where the second component additionally includes at least an electrical connection; and at least a mechanical connection, and where the sealing rim, the first component, and the second component are all joined together by welding, at least a battery module installed within the inner volume of the case, and an inner panel installed within the inner volume, between the case and the at least a battery module.

In another aspect a method of manufacture for a battery pack includes manufacturing a metal case circumscribing an inner volume circumscribed on all but one open side, where manufacturing a case additionally includes forming through bending a first component to include at least two or more sides of the case, forming through machining a second component to include at least one other side of the case, where the second component additionally includes at least an electrical connection, and at least a mechanical connection, and positioning a sealing rim at least partially about the open side, and joining together at least the first component, the second component, and the sealing rim by welding, installing at least a battery module within the inner volume of the case, and installing an inner panel within the inner volume, between the case and the at least a battery module.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for safely and efficiently enclosing a battery pack. In an embodiment, a battery pack enclosure may include a box welded together from at least two separate components a first component, which may be sheet-metal, and which comprises multiple sides of the box and a second metal component, which may be machined, that comprises at least one side of the box; in some cases, the box may be welded together. According to an exemplary embodiment, battery pack enclosure may include a five-sided box, which may be open on one side.

Aspects of the present disclosure can be used to manufacture a battery pack with reduced costs. Aspects of the present disclosure can also be used to produce a battery pack having an enclosure with increased rigidity and increased ability to contain a battery fire within the enclosure. This is so, at least in part, because exemplary enclosures as taught by this disclosure are rigid and resist compression forces and impact, are sealed and thereby act as a firewall to contain fire within the enclosure and are designed to be efficiently manufactured.

Aspects of the present disclosure allow for battery packs to be produced which are cost-efficient and safe, allowing for the promise of electric vehicles, which has for so long been proselytized, to finally be realized. Exemplary embodiments illustrating aspects of the present disclosure are described below in the context of several specific examples.

Figure 1:
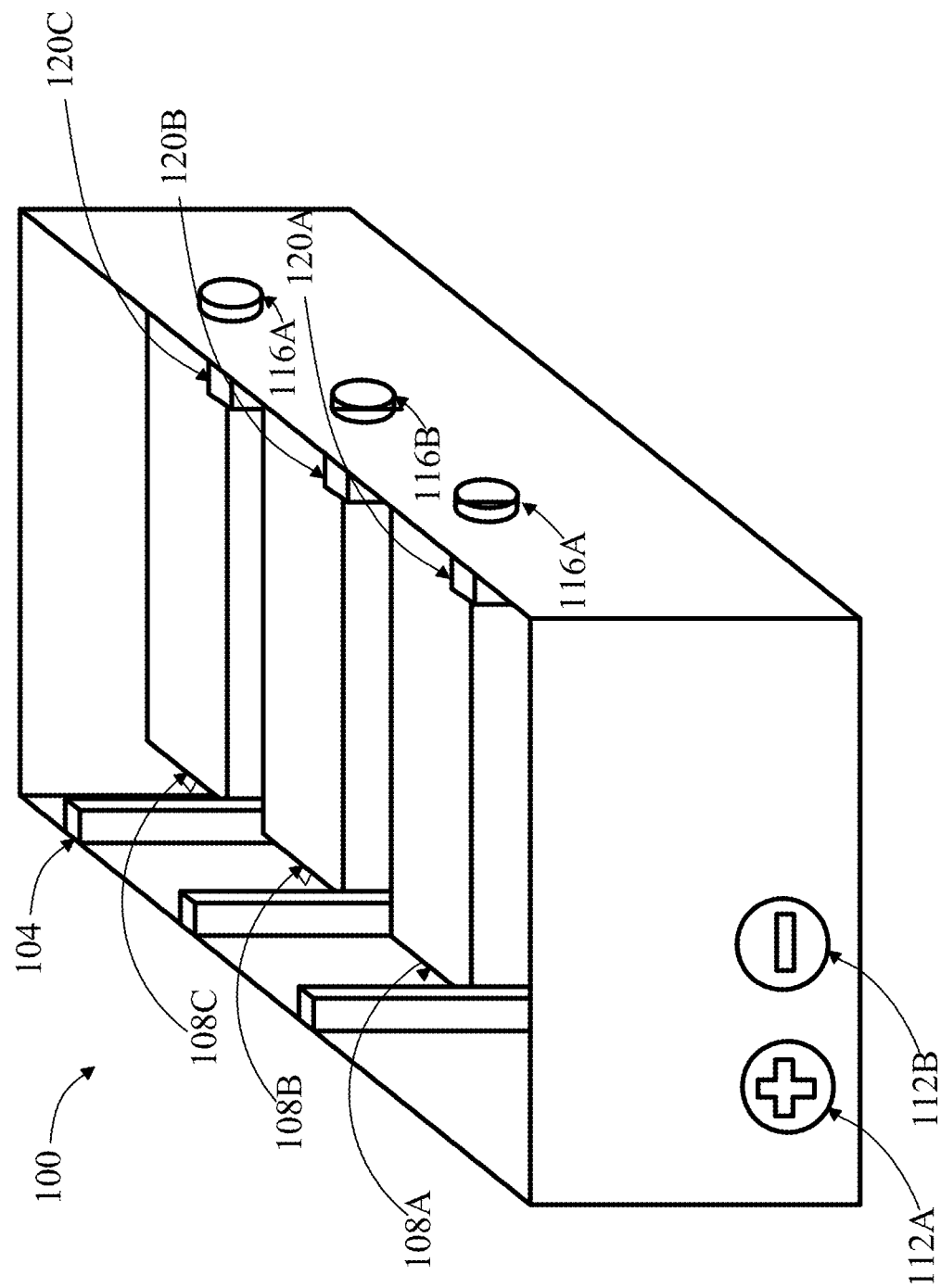
FIG. 1 is a schematic illustration of an exemplary battery pack.

Referring now to the drawings, FIG. 1 illustrates an exemplary battery pack 100. According to some embodiments, a battery pack 100 includes an outer case 104. In some cases, case 104 may be made from metal for example one or more of sheet metal, stamped metal, extruded metal, and/or machined metal. In some cases, case 104 may be formed by way of welding, brazing, and/or soldering. In some cases, case 104 may be composed wholly or in part of a relatively light and strong metal, such as without limitation aluminum alloy. As shown in FIG. 1, case 104, may include an outer case, which may substantially enclose a plurality of battery modules 108A-C. In some versions, case may provide a firewall between flammable battery modules within battery pack and an environment or vehicle surrounding the battery pack.

Continuing in reference to FIG. 1, Battery modules 108A-C may include any battery modules or battery cells described throughout this disclosure, for instance without limitation those described below. Typically, battery modules 108A-C are connected in series to one another, such that a total potential for all of the battery modules together is greater than a potential for any one of the battery modules (e.g., 108A). In some cases, a shared electrical connection from plurality of modules 108A-C may be accessible by way of an electrical connector 112A-B. In some cases, the electrical connector 112A-B may have a polarity and include a positive connection 112A and a negative connection 112B. In some cases, one or more battery modules of plurality of battery modules 108A-C may be mounted to case 104 by way of at least a breakaway mount 116A-C. In some embodiments, a breakaway mount may include any means for attachment that is configured to disconnect under a predetermined load. In some cases, breakaway mounts may be passive and rely upon loading forces for disconnection, such as exemplary breakaway mounts which may include one or more of a shear pin, a frangible nut, a frangible bolt, a breakaway nut, bolt, or stud, and the like. In some cases, a passive breakaway mount may include a relatively soft or brittle material (e.g., plastic) which is easily broken under achievable loads. Alternatively or additionally, a breakaway mount may include a notch, a score line, or another weakening feature purposefully introduced to the mount to introduce breaking at a prescribed load. According to some embodiments, a canted coil spring may be used to as part of a breakaway mount, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. An exemplary canted coil spring may be provided by Bal-Seal Engineering, Inc. of Foothill Ranch, Calif., U.S.A. Alternatively or additionally, a breakaway mount may include an active feature which is configured to actively disconnect a mount under a prescribed condition (for instance a rapid change in elevation or large measured G-forces). Much like an airbag that is configured to activate during a crash, an active mount may be configured to actively disconnect during a sensed crash. An active mount may, in some cases, include one or more of an explosive bolt, an explosive nut, an electro-magnetic connection, and the like. In some cases, one or more breakaway mounts 116A-C may be configured to disconnect under a certain loading condition, for instance a force in excess of a predetermined threshold (i.e., battery breakaway force) acting substantially along (e.g., within about+/−45°) a predetermined direction. Non-limiting exemplary battery breakaway forces may include decelerations in excess of 4, 12, 20, 50, or 100 G's.

In some embodiments, a case 104 circumscribes an inner volume, which may include a battery storage zone, for instance within which battery modules 108A-C are located, and a crush zone. As a non-limiting example, crush zone may be located between one or more battery modules 108A-C and an inner wall of case 104. In some embodiments, crush zone may be substantially empty. Alternatively, in some other embodiments, crush zone may comprise some material, such as without limitation a compressible material. In some cases, compressible material may be configured to absorb and/or dissipate energy as it is compressed. In some cases, compressible material may include a material having a number of voids; for instance, compressible material may take a form of a honeycomb or another predictably cellular form. Alternatively or additionally, compressible material may include a non-uniform material, such as without limitation a foam. In some embodiments, a crush zone may be located down from one or more battery modules 108A-C substantially along a loading direction, such that for instance the one or more battery modules when disconnected from one or more breakaway mounts 116A-C may be directed toward crush zone. In some cases, case 104 may include one or more channels or guides 120A-C configured to direct at least a battery module 108A-C into a crush zone, should it become disconnected from the case.

Still referring to FIG. 1, in some embodiments, battery module 108A-C may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules 108A-C may include lead-based batteries such as without limitation lead acid batteries and lead carbon batteries. Battery modules 108A-C may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, case 104 is constructed in a manner that maximizes manufacturing efficiencies.

Figure 2:
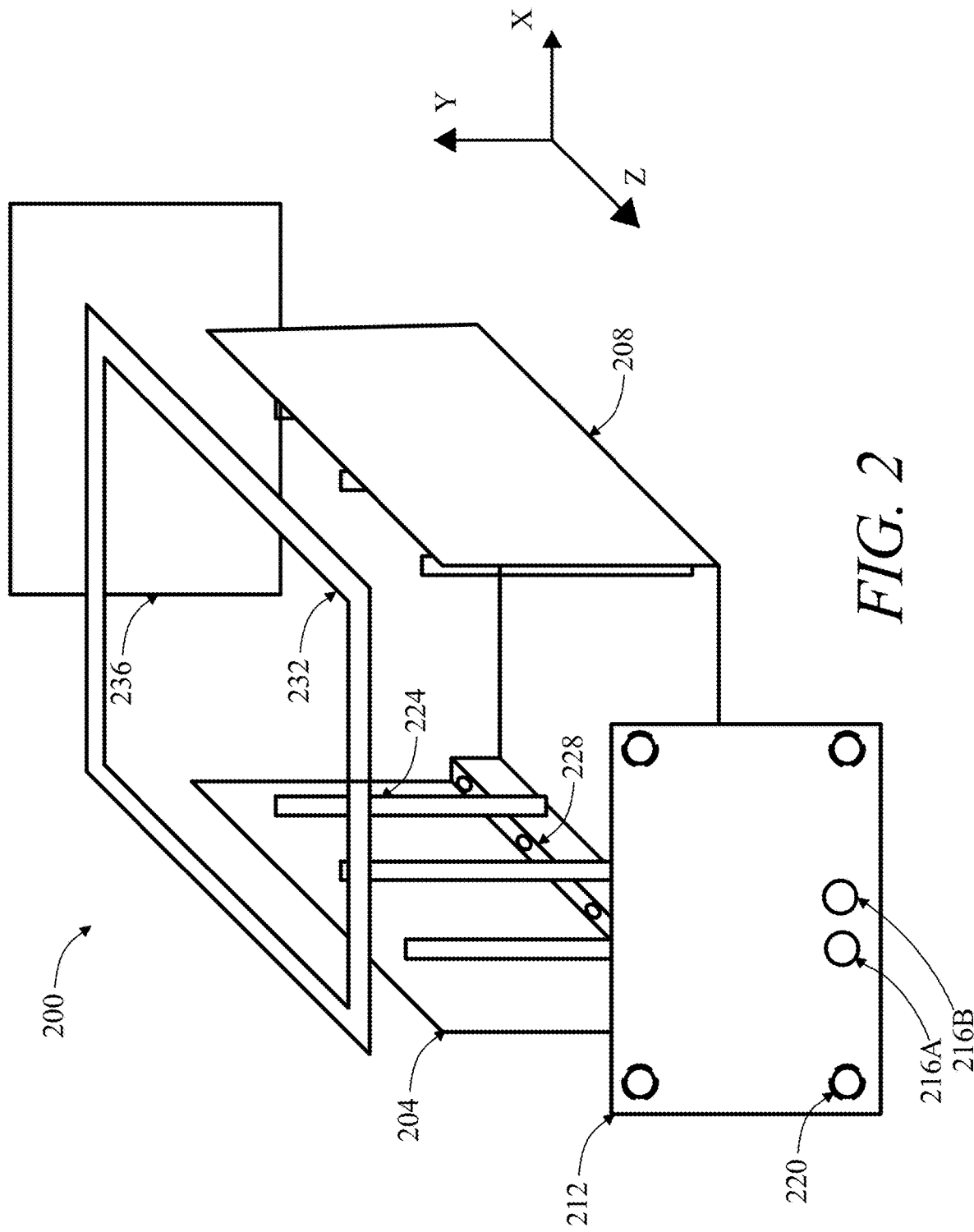
FIG. 2 is a schematic illustration of an unassembled exemplary battery pack.

Referring now to FIG. 2, an exemplary unassembled case 200 is schematically shown. According to some embodiments, case may constitute a first component 204 that comprises two or more sides. In some embodiments, first component 204 may comprised formed sheet-metal. Formed sheet-metal may include, for instance without limitation a folded edge 208 or corner. Folded features, such as a folded edge 208, may differ from other metal features of the same shape in that folding process used to produce such folded features introduces yields and cold-works metal about such folded features. References to sheet-metal within this disclosure should not be understood as limited to sheet metal workpieces or items prepared according to any specific manufacturing method; any manufacturing method or process capable of producing a sheet metal part and/or workpiece is contemplated as within the scope of this disclosure. Sheet-metal may include any formation of metal in a sheet, for instance metal that has a thickness less than about 5 mm, or 3 mm and/or has a folded stamped or sheared feature. In some cases, first component 204 may constitute three sides of an unassembled box 200, as is shown in FIG. 2. For instance, first component 204 may be formed according to understood sheet metal processes into a shape, such as a U-channel. Alternatively or additionally, in some embodiments first component may include an extrusion. Extruded metal differs from sheet-metal in a number of ways. For instance. extruded metal may be of a different grade than sheet-metal; also, extruded metal may not typically have cold-worked metal about corner and edge features as sheet-metal often does. This is because extrusions may commonly be performed at elevated temperatures, which may effectively eliminate most dislocations within a crystalline structure of an extruded metal that may be associated with cold work and sheet-metal forming processes. In another non-limiting example first component 204 may include four sides of a case. In yet another non-limiting example first component 204 may comprise only 2 sides of a case, such as in an "L" shape.

Continuing in reference to FIG. 2, a case may additionally include a second component 212. In some cases, second component 212 may include machined features, for instance without limitation threaded holes, blind holes, through holes, pockets, shoulders, and the like. Machined features, in some cases, differ in shape and profile from other types of metal described in this disclosure (e.g., sheet-metal). Additionally, machined metal may be heat treated and free from cold-work and dislocations common with formed sheet-metal. Additionally, machined metal features may be formed through removal of material by way of chip formation. This method of formation may yield shapes, profiles, and measurable surface finishes that are distinct when compared to other types of metal described in this disclosure (e.g., sheet-metal). For at least these reasons, reference to a machined metal or feature, should not necessitate a product-by-process interpretation. In some cases, second component 212 may include at least an electrical connection 216A-B. Electrical connection may comprise any of a high voltage connection 216A to at least a battery module or a low voltage connection 216B to at least a battery module. In some instances, a high voltage connection 216A to at least a battery module may be used to provide power from the at least a battery module; in some cases, the high voltage connection 216A may be configured to conduct electricity having a potential within a range of about 12 to 1,000V. Likewise, in some instances, a low voltage connection may be used to provide communications with at least a battery module or a corresponding battery controller; in some cases, the low voltage connection may be configured to conduct electricity having a potential within a range of about 0.1 to 24V. In some cases, second component 212 includes at least a mechanical connection 220, which allows mounting of battery pack, such as without limitation to an electrical aerial vehicle. Mechanical connection 220 may include a breakaway mount which may be configured to disconnect battery pack under a predetermined load, for instance during an impact of a force in excess of a threshold amount or maximum.

Continuing in reference to FIG. 2, in some embodiments, a breakaway mount may include any means for attachment that is configured to disconnect under a predetermined load. In some cases, breakaway mounts may be passive and rely upon loading forces for disconnection; for instance exemplary breakaway mounts may include one or more of a shear pin, a frangible nut, a frangible bolt, a breakaway nut, bolt, or stud, or the like. In some cases, a passive breakaway mount may include a relatively soft or brittle material (e.g., plastic) which may be easily broken under achievable loads. Alternatively or additionally, a breakaway mount may include a notch, a perforation, a score line, and/or another weakening feature purposefully introduced to the breakaway mount to introduce breaking at a prescribed load. According to some embodiments, a canted coil spring may be used to as part of a breakaway mount, to ensure that the breakaway mount disconnects under a predetermined loading condition. In some cases a mount may comprise a canted coil spring, a housing, and a piston; and sizes and profiles of the housing and the piston may be selected in order to prescribe a force required to disconnect the mount. An exemplary canted coil spring may be provided by Bal-Seal Engineering, Inc. of Foothill Ranch, Calif., U.S.A. Alternatively or additionally, a breakaway mount may include an active feature which is configured to actively disconnect the breakaway mount under a prescribed condition, such as without limitation a rapid change in elevation, large, measured force, large measured deceleration, or the like. Much like an airbag that is configured to activate during a crash, an active mount may be configured to actively disconnect during a sensed crash. An active mount may, in some cases, include one or more of an explosive bolt, an explosive nut, an electro-magnetic connection, and the like. In some cases, one or more breakaway mounts may be configured to disconnect under a certain loading condition, for instance a force in excess of a predetermined threshold (i.e., battery pack breakaway force) acting substantially along (e.g., within about)+/−45° a predetermined direction. Non-limiting exemplary battery pack breakaway forces may include decelerations in excess of about 4, 12, 20, 50, or 100 G's.

Continuing in reference to FIG. 2, in some embodiments, case additionally may include at least a compression tube 224. At least a compression tube 224 may be installed within case to provide added rigidity and resistance to compressive forces substantially along a predetermined axis, for instance a vertical axis, shown as "Y" in FIG. 2. In some embodiments, compression tubes may include a metal that may be similar or non-similar to metal of first component 204 and/or second component 212. In some cases, compression tubes 224 may be non-metal; for instance, compression tubes may be ceramic. In some cases, compression tubes 224 may be welded into case; alternatively or additionally compression tubes may be mounted within case using any known attachment means, including without limitation interference (i.e., press) fit, clearance (i.e., slip) fit, fasteners, adhesives, and the like.

Still referring to FIG. 2, according to some embodiments, case may include a module support 228. Module support 228 may be configured to mount at least a battery module. In some cases, module support may be composed of machined metal, as described in this disclosure. Module support 228 may include one or more machined features, such as without limitation threaded holes, through holes, pockets, locating features, high tolerance features (e.g., no more than +/−0.01"), and the like. In some embodiments, module support may be mounted to case (e.g., first component and/or second component) by way of one or attachment means including without limitation welding, soldering brazing, adhesive, fasteners, and the like.

Still referring to FIG. 2, according to some embodiments, case additionally includes a sealing rim 232. In some cases, sealing rim 232 substantially surrounds an open face of case; in some versions, the sealing rim 232 substantially surrounds the only open face of the case and the rest of the case remains sealed. In some embodiments, sealing rim 232 may comprise a metal that is similar or non-similar to metal of first component 204 and/or second component 212. In some cases, sealing rim 232 may be non-metal; for instance, sealing rim 232 may be ceramic. In some cases, sealing rim may comprise machined metal, as described in this disclosure. Sealing rim 232 may include one or more machined features, such as without limitation threaded holes, through holes, pockets, locating features, high tolerance features (e.g., no more than +/−0.01"), and the like. In some cases, sealing rim 232 may be welded into case, alternatively or additionally sealing rim 232 may be mounted onto case using any known attachment means, including without limitation interference (i.e., press) fit, clearance (i.e., slip) fit, fasteners, adhesives, and the like. In some cases, sealing rim may be mounted only to first component 204. In some cases, sealing rim 232 may be configured to interface and mount to a cover. A seal between cover and sealing rim 232 may be provided for by a gasket or any other sealing mechanism, such as without limitation seals, O-rings, interference press fits, lip seals, and the like.

Still referring to FIG. 2, according to some embodiments, a third component 236 may be included in case. Third component may, as is shown in FIG. 2, be located opposite second component 212; additionally, third component 236 may include some or all of characteristics, configurations, and features of the second component 212. Accordingly, in some cases, third component 236 may comprises machined features, for instance without limitation threaded holes, blind holes, through holes, pockets, shoulders, and the like. Machined features, in some cases, differ in shape and profile from other types of metal described in this disclosure (e.g., sheet-metal). Additionally, machined metal may be heat treated and free from cold-work and dislocations common with formed sheet-metal. Machined metal therefore may have a homogenous temper throughout, unlike for instance sheet-metal. Additionally, machined metal features may be formed through removal of material by way of chip formation. This method of formation may yield shapes, profiles, and measurable surface finishes that are distinct when compared to other types of metal described in this disclosure (e.g., sheet-metal). For instance machined metal components may achieve tolerances in a range of about 0.0005" to about 0.01," Whereas sheet-metal tolerances may seldom be less than about 0.005". Additionally, surface finish for a machined part may commonly have an average surface roughness ($R_a$) from between about 10 to about 250 μin, whereas sheet-metal surface finish may run a gambit from a mirror polish to a "mill" cold rolled finish, with brushed surfaces finished in between, although commonly, sheet-metal may exhibit a rougher surface finish than a machined component. For at least these reasons, reference to a machined metal or feature, should not necessitate a product-by-process interpretation. In some cases, third component 236 may include at least an electrical connection. In some cases, third component 236 may include at least a mechanical connection, which may allow mounting of battery pack, for instance without limitation to an electrical aerial vehicle.

Still referring to FIG. 2, in some embodiments, some or all components may be attached by way of one or more of welding, brazing, and/or soldering. For instance in some situations, first component 204 and second component 212 may be welded together, such that both components are sealed at a weld joint. In some versions, substantially all of case is welded together, so that an inner volume of case may be continuously sealed on at least 5 sides by the case.

Figure 3:
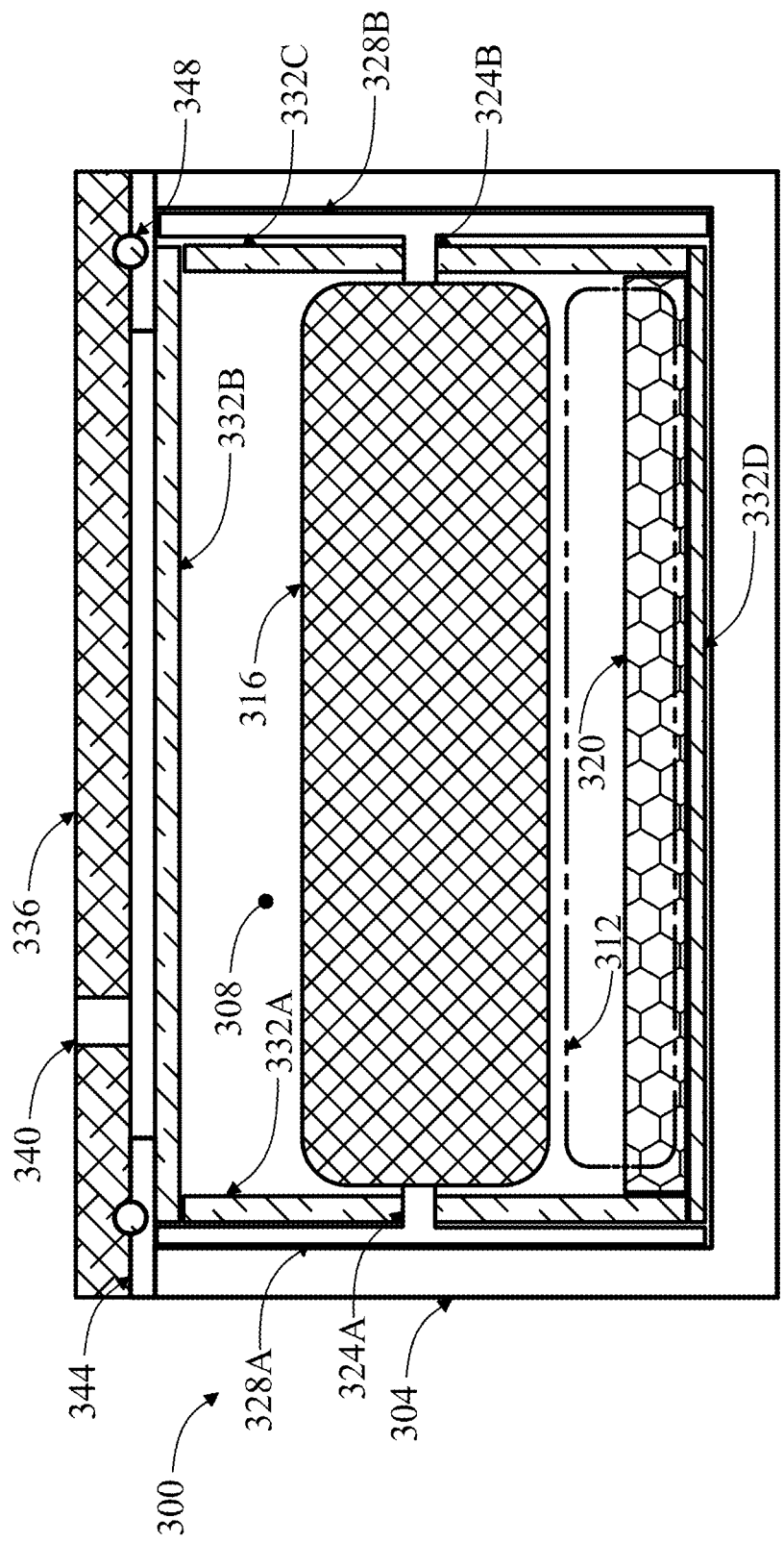
FIG. 3 is a cross-sectional view of a schematic illustration of an exemplary battery enclosure.

Referring to FIG. 3, a cross-sectional view of an exemplary enclosure 300 for a battery pack is schematically illustrated. A case 304 is shown encompassing an inner volume 308. In some versions, inner volume includes at least a crush zone 312. Crush zone 312 may include a volume within inner volume 308 inside which substantially no battery modules may typically be present. Crush zones may be purposefully configured to crumple, deform, or otherwise change shape or contents during a crash or impact. Typically, crush zone 312 may be located between one or more battery modules 316 and an inner wall of case 304. In some embodiments, crush zone may be substantially empty. Alternatively, in some other embodiments, crush zone 312 may comprise some material, such as without limitation a compressible material 320. In some cases, compressible material 320 may be configured to absorb and/or dissipate energy as it is compressed. In some cases, compressible material 320 may include a material having a number of voids, for instance compressible material may take a form of a honeycomb or another predictably cellular form. Alternatively or additionally, compressible material 320 may include a non-uniform material, such as without limitation a foam. In some embodiments, a crush zone 312 may be located down from one or more battery modules 308 substantially along a loading direction, such that for instance the one or more battery modules when disconnected from one or more mounts 324A-B are directed toward crush zone 312. In some versions, one or more mounts 324A-B may comprise a breakaway mount, as described in this disclosure. In some cases, case 304 may include one or more channels or guides that may be configured to direct at least a battery module 316 into a crush zone 312, should the battery module become disconnected from the case.

Still referring to FIG. 3, in some embodiments, enclosure 300 may include at least an inner panel 328A-B. Inner panel may be located between an inner wall of case 304 and at least a battery module 316. In some cases, at least an inner panel 328A-B may be a composite material, for instance to reduce weight of enclosure 300. A composite material may include a reinforced plastic (e.g., fiberglass, carbon fiber, and the like). In some cases, one or more mounts 324A-B may be affixed to at least an inner panel 328A-B. In some embodiments, at least an inner panel 328A-B may be configured to position at least a battery module 316. Additionally or alternatively, in some embodiments, at least an inner panel 328A-B may be configured to provide structural support and/or load transfer to enclosure. In some cases, at least an inner panel 328A-B may include an electrically insulating material and may be configured to provide electrical insulation between a battery module and electrically conductive components.

Still referring to FIG. 3, in some embodiments, enclosure may include at least a lining 332A-D. Lining 332A-D may be located between an inner wall of case 304 and at least a battery module 316. In some cases, at least a lining 332A-D may include an electrically insulating material, such as without limitation a polymer, a foam, a ceramic, and the like. In some versions, lining 332A-D may be configured to limit prevalence of situations that may result in short circuiting between electrically conductive components (such as case 304) and at least a battery module 316 or one or more electrical connections within battery pack.

Still referring to FIG. 3, in some embodiments, enclosure 300 may include a cover 336. Cover 336 may comprise metal (e.g., sheet-metal, machined metal, and the like). In some cases, cover may include at least a vent 340. Alternatively or additionally, in some cases, at least one of first component 204, second component 212, third component 236, and/or case 304 comprise vent 340. Vent 340 may be configured to allow for flow of fluids (e.g., air) between an inner volume 308 within enclosure 300 to outside the enclosure, such as without limitation an environment surrounding the enclosure. Vent 340, in some embodiments, may be configured to allow for controlled flow of fluids, such as without limitation with one or more of a valve, a regulator, and/or a filter. In some embodiments vent 340 may be in fluidic communication with one or more channels configured to further route a flow of fluids. In some embodiments, cover 336 may be mounted to enclosure 300 by way of a sealing rim 344. Sealing rim 344 may be attached to case 304 by way of any attachment method described within this disclosure. In some versions, a gasket 348 may be positioned between cover 340 and sealing rim 348 to enclosure 300, thereby preventing fluid ingress/egress from/to inner volume 308 not through vent 340.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Figure 4:
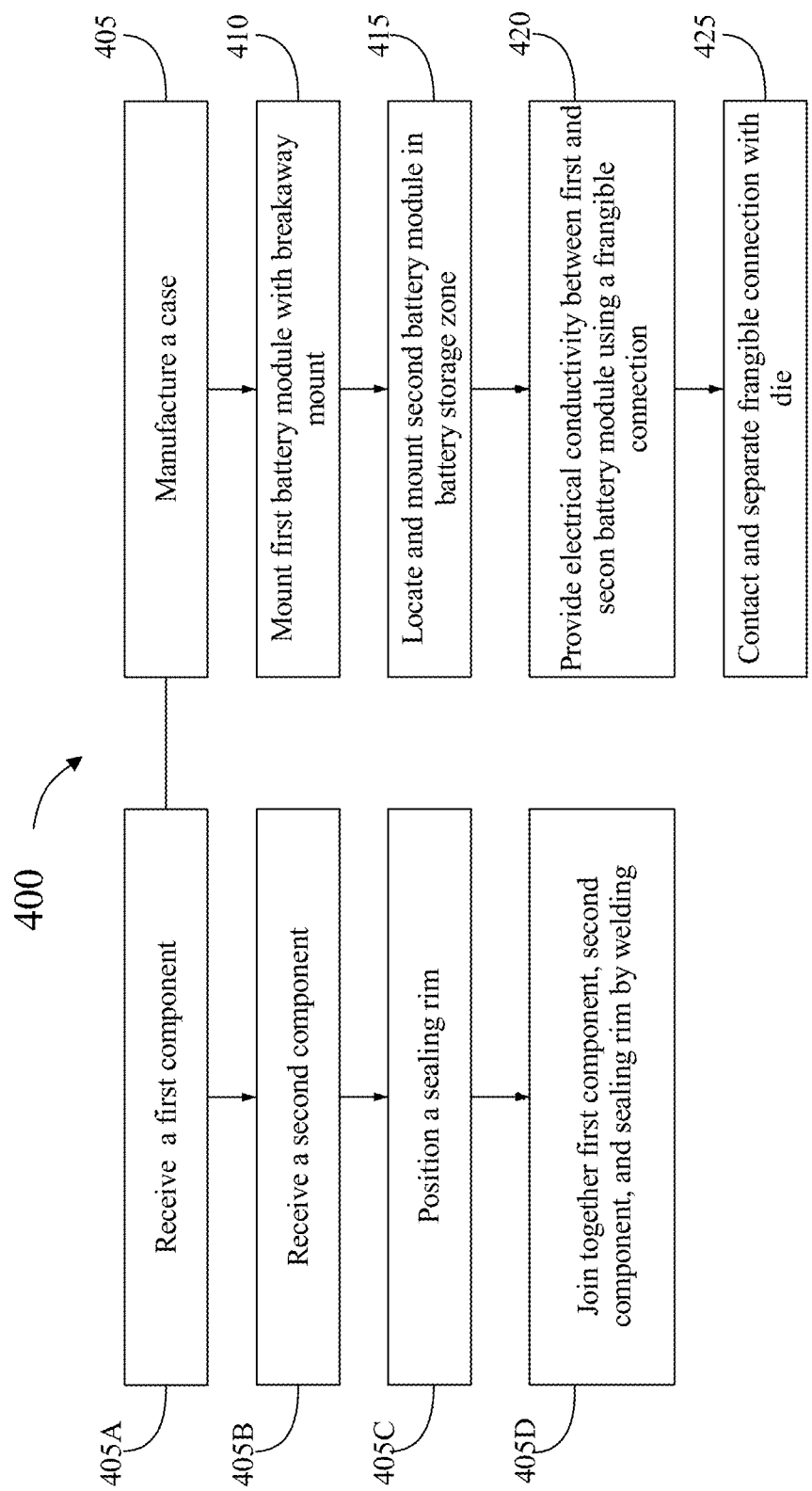
FIG. 4 is a flow diagram of an exemplary method of manufacture for a battery pack.

Referring now to FIG. 4, a flow diagram illustrates an exemplary method of manufacture 400 for a battery back, according to some embodiments. At step 405, a metal case is manufactured. In some versions, metal case circumscribes an inner volume, which is circumscribed on all but one open side. Case may include any case described in this disclosure, including for instance in reference to FIGS. 1-3. Inner volume may include any inner volume described in this disclosure, for instance in reference to FIGS. 1-3. In some embodiments, step 405 may additionally include a number of sub-steps. For instance at sub-step 405A, a first component may be received. First component may comprise at least two or more sides of case. In some cases, a first component may be formed through bending to comprise at least two or more sides of case. At sub-step 405B, a second component may be received. Second component may comprise at least two or more sides of case. In some cases, a second component may be formed through machining to comprise at least one other side of case. In some versions, second component may additionally include at least an electrical connection and at least a mechanical connection. At sub-step 405C, a sealing rim may be positioned at least partially about an open side of case. And finally, at sub-step 405D, first component, second component, and sealing rim may all be joined together by welding. First component may include any first component described in this disclosure, for instance in reference to FIGS. 1-3. Second component may include any second component described in this disclosure, for instance in reference to FIGS. 1-3. sealing rim may include any sealing rim described in this disclosure, for instance in reference to FIGS. 1-3. Bending may include bending of sheet-metal, for instance without limitation with any of a die, a punch, and a press. Machining may include machining of metal, for instance without limitation with any of a mill, a drill, and a lathe. In some versions, first component may include folded sheet-metal and second component may include machined features. In some versions, mechanical connection may include a breakaway mount that is configured to release battery pack under a predetermined load. In some versions, inner volume of case further comprises a crush zone that contains substantially no battery modules. In some versions, a manufactured case comprises a five-sided box having one open side. In some versions, substantially all joints about case between different components are welded shut, thereby sealing case. In some versions substantially no fasteners are used to manufacture case.

Continuing in reference to FIG. 4, at step 410, at least a battery module is installed within an inner volume of case. Battery module may include any battery module described within this disclosure, for instance in reference to FIGS. 1-3. In some embodiments, installation of components within case is performed through open side, for instance through the only open side of the case. In some instances, installation through open side improves manufacturing efficiencies (e.g., time, cost, waste, and the like) by reducing amount of repositioning required of case during install. In some cases, installation of components within case may be automated, such as without limitation with a pick-and-place machine, a robotic arm, a robotic welder, and the like.

Continuing in reference to FIG. 4, at step 415, an inner panel is installed within an inner volume of case. In some versions, inner panel may be installed between case and at least a battery module. Inner panel may include any inner panel described within this disclosure, for instance in reference to FIGS. 1-3. In some versions, inner panel is configured to position at least a battery module within case. In still further versions, inner panel is further configured to direct movement of at least a battery module within case.

Still referring to FIG. 4, in some embodiments, method 500 additionally may include attaching a cover over open side of case to sealing rim. In some versions, cover additionally includes at least a vent. In some versions, method additionally includes sealing case and cover using a seal.

Still referring to FIG. 4, in some embodiments, method 500 additionally may include installing at least a compression tube in case, where the compression tube is oriented substantially along a first axis and configured to resist compression of case.

Practice of the present invention may be aided by use of parameter ranges and characteristics described within Table 1.

|  | Minimum | Maximum | Nominal |
| --- | --- | --- | --- |
| Battery Potential (Volts) | 12 | 2000 | 500 |
| Battery Controller Potential (Volts) | 0.5 | 25 | 5 |
| Battery Breakaway Deceleration (G's) | 2 | 100 | 20 |
| Case Materials | Aluminum alloy, steel, stainless steel, titanium, magnesium, brass, bronze, copper, beryllium, molybdenum, and the like. | | |
| Inner Panel Materials | Fiberglass, carbon fiber, thermoplastic composites, thermoset composites, and the like. | | |
| Liner Materials | Polyethylene (PE), polytetrafluorethylene (PTFE), and the like | | |
| Gasket Materials | Silicone, Fluorosilicone, Buna-N, and the like | | |
| Welding Processes | Laser welding, electric resistance welding, gas tungsten arc welding (GTAW), metal inert gas welding, friction stir welding, spot welding, electron beam welding, and the like. | | |
| Sheet-metal forming processes | Bending, stamping, pressing, and the like. | | |
| Machining processes | Milling, drilling, turning, electrical discharge machining, and the like. | | |

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery pack comprising:
a metal case circumscribing an inner volume comprising a first breakaway mount;
at least a battery module installed within the inner volume of the case;
a first breakaway mount is configured to disconnect the at least a battery module from the metal case under a predetermined load;
a crush zone disposed within the inner volume of the case and positioned below the at least a battery module, wherein the crush zone initially contains substantially no battery modules and is configured to receive the at least a battery module when disconnected by the first breakaway mount and comprises a compressible material configured to absorb a movement the disconnected at least a battery module.

2. The battery pack of claim 1, wherein the first breakaway mount further comprises a brittle material.

3. The battery pack of claim 1, wherein the first breakaway mount further comprises a passive breakaway mount, wherein the passive breakaway mount is configured to disconnect the battery pack passively from the electric aircraft under a predetermined load.

4. The battery pack of claim 1, wherein the at least a breakaway mount further comprises an active breakaway mount, wherein the active breakaway mount is configured to disconnect the battery pack activity from the electric aircraft under a prescribed condition.

5. The battery pack of claim 1, wherein the first breakaway mount further comprises a battery breakaway force along a predetermined direction.

6. The battery pack of claim 1, wherein the case further includes at least a guide to direct, on disconnection, the battery module into the crush zone.

7. The battery pack of claim 1 further comprising an inner panel configured to position the at least a battery module within the case.

8. The battery pack of claim 7, wherein the inner panel is further configured to direct movement of the at least a battery module within the case.

9. The battery pack of claim 1, wherein the case further comprises at least a compression tube installed in the case, wherein:
the compression tube is oriented substantially along a first axis; and
the compression tube is configured to resist compression of the case.

10. A method of manufacture for a battery pack comprising:
manufacturing a metal case circumscribing an inner volume circumscribed on all but one open side, wherein the inner volume further comprises a first breakaway mount;
installing at least a battery module within the inner volume of the case;
installing a crush zone within the inner volume of the case and positioned below the at least a battery module, wherein the crush zone is configured to receive the at least a battery module when disconnected by the first breakaway mount and comprises a compressible material configured to absorb a movement of the disconnected at least a battery module and comprises a compressible material;
wherein the first breakaway mount is configured to disconnect the at least a battery module from the metal case under a predetermined load.

11. The method of claim 10, wherein the first breakaway mount further comprises a brittle material.

12. The method of claim 10, wherein the first breakaway mount further comprises a passive breakaway mount, wherein the passive breakaway mount is configured to disconnect the battery pack passively from the electric aircraft under a predetermined load.

13. The method of claim 10, wherein the at least a breakaway mount further comprises an active breakaway mount, wherein the active breakaway mount is configured to disconnect the battery pack activity from the electric aircraft under a prescribed condition.

14. The method of claim 10, wherein the first breakaway mount further comprises a battery breakaway force along a predetermined direction.

15. The method of claim 10, wherein the case further includes at least a guide to direct, on disconnection, the battery module into the crush zone.

16. The method of claim 10, further comprising installing an inner panel configured to position the at least a battery module within the case.

17. The method of claim 16, wherein the inner panel is further configured to direct movement of the at least a battery module within the case.

18. The method of claim 10, wherein the case further comprises at least a compression tube installed in the case, wherein:
the compression tube is oriented substantially along a first axis; and
the compression tube is configured to resist compression of the case.

* * * * *